(12) United States Patent
Cimaglio et al.

(10) Patent No.: US 9,174,881 B2
(45) Date of Patent: Nov. 3, 2015

(54) READY MIXED SETTING TYPE JOINT COMPOUND AND SET INITIATOR IN CHAMBERED POUCH

(75) Inventors: Scott Cimaglio, Antioch, IL (US); Salvatore C. Immordino, Trevor, WI (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 12/613,297

(22) Filed: Nov. 5, 2009

(65) Prior Publication Data
US 2011/0100844 A1   May 5, 2011

(51) Int. Cl.
| | |
|---|---|
| *C04B 40/06* | (2006.01) |
| *B65D 81/32* | (2006.01) |
| *C04B 28/14* | (2006.01) |
| *C04B 111/00* | (2006.01) |

(52) U.S. Cl.
CPC .......... *C04B 40/065* (2013.01); *B65D 81/3266* (2013.01); *C04B 28/14* (2013.01); *C04B 2111/00689* (2013.01)

(58) Field of Classification Search
CPC .... C04B 14/42; C04B 14/102; C04B 14/185; C04B 22/16; C04B 22/148; C04B 24/06; C04B 24/383; C04B 24/2623; C04B 28/14; C04B 40/065; C04B 40/0858; C04B 2103/69; C04B 2111/00689
USPC .......... 206/219, 222; 106/648–651, 724, 725, 106/776–795, 802, 819
See application file for complete search history.

(56) References Cited

U.S. PATENT DOCUMENTS

| | | | |
|---|---|---|---|
| 2,756,875 A | 7/1956 | Yochim | |
| 3,074,544 A * | 1/1963 | Bollmeier et al. | 206/219 |
| 3,705,646 A | 12/1972 | Jankowski et al. | |
| 3,819,107 A | 6/1974 | Ryder, Jr. | |
| 4,509,642 A | 4/1985 | Rowell | |
| 4,516,884 A | 5/1985 | Douty | |

(Continued)

FOREIGN PATENT DOCUMENTS

| | | |
|---|---|---|
| CN | 1062119 A | 6/1992 |
| CN | 1155878 A | 7/1997 |

(Continued)

OTHER PUBLICATIONS

Rejection Decision issued by the Taiwan Intellectual Property Office in Taiwan Patent Application No. 099136651 dated May 5, 2015.

(Continued)

*Primary Examiner* — Bryon Gehman
(74) *Attorney, Agent, or Firm* — Greer, Burns & Crain, Ltd.; Pradip Sahu; Philip T. Petti

(57) ABSTRACT

A dosage size multi-chambered, container having separate sealed compartments is provided and includes constituent materials for forming a wallboard joint compound. The container includes a first compartment containing a first mixture including calcined gypsum, a set preventer and water, and a second compartment sealed from the first compartment with a seal and containing a second mixture including a set initiator and water, wherein upon breaking of the seal, the first and second mixtures are combinable by kneading action to provide a dose of the wallboard joint compound.

11 Claims, 1 Drawing Sheet

(56) References Cited

U.S. PATENT DOCUMENTS

| | | |
|---|---|---|
| 4,557,377 A | 12/1985 | Maloney |
| 4,661,161 A | 4/1987 | Jakacki et al. |
| 5,282,697 A | 2/1994 | Maechtle |
| 5,494,190 A * | 2/1996 | Boettcher ............... 206/219 |
| 5,709,467 A | 1/1998 | Galliano, II |
| 5,746,822 A | 5/1998 | Espinoza et al. |
| 6,228,163 B1 | 5/2001 | Espinoza et al. |
| 6,298,984 B1 | 10/2001 | Weaver et al. |
| 6,352,585 B1 | 3/2002 | Diesso |
| 6,379,458 B1 | 4/2002 | Immordino et al. |
| 6,406,537 B1 | 6/2002 | Immordino |
| 6,409,823 B1 * | 6/2002 | Shake et al. ............ 106/772 |
| 6,673,144 B2 * | 1/2004 | Immordino et al. ...... 106/778 |
| 6,695,901 B2 | 2/2004 | Diesso |
| 6,790,277 B2 * | 9/2004 | Ayambem .............. 106/795 |
| 6,805,741 B1 | 10/2004 | Liu et al. |
| 7,150,787 B2 * | 12/2006 | Clamen et al. ........... 106/778 |
| 7,270,233 B2 | 9/2007 | Kindt |
| 7,754,006 B2 * | 7/2010 | Liu et al. ............... 106/778 |
| 8,056,726 B2 * | 11/2011 | Huff et al. ............... 206/568 |
| 2004/0016655 A1 | 1/2004 | Goodman |
| 2005/0288397 A1 | 12/2005 | Piazza |
| 2006/0042519 A1 | 3/2006 | Bowe et al. |
| 2006/0118434 A1 | 6/2006 | Leiner et al. |
| 2007/0217971 A1 | 9/2007 | Michalsky et al. |
| 2007/0253761 A1 | 11/2007 | May |
| 2008/0083348 A1 | 4/2008 | Kuo et al. |
| 2008/0178769 A1 | 7/2008 | Goodwin et al. |
| 2008/0229981 A1 | 9/2008 | Liu et al. |
| 2010/0236951 A1 * | 9/2010 | Huff et al. ............... 206/222 |

FOREIGN PATENT DOCUMENTS

| | | |
|---|---|---|
| CN | 1762877 A | 4/2006 |
| DE | 196 12 965 A1 | 10/1997 |
| EP | 0 513 364 A1 | 11/1992 |
| EP | 0 681 998 A1 | 11/1995 |
| EP | 1316537 Al | 6/2003 |
| EP | 1 801 029 A1 | 6/2007 |
| JP | H07-052140 | 2/1995 |
| JP | 2009196668 A | 9/2009 |
| WO | 9504709 | 2/1995 |
| WO | 9610477 | 4/1996 |
| WO | WO 2008/091184 A1 | 7/2008 |

OTHER PUBLICATIONS

Replacement Patent Examination Report No. 2 issued by IP Australia in Australian Patent Application No. 2010315648 dated Dec. 10, 2014.

"Notification of Reasons for Rejection" issued by the Japanese Patent Office in Japanese Patent Application No. 2012-536883 dated Mar. 31, 2015.

Third Office Action issued by the Chinese Patent Office in Chinese Patent Application No. 201080047838.6 dated Sep. 2, 2014.

* cited by examiner

… (US 9,174,881 B2)

READY MIXED SETTING TYPE JOINT COMPOUND AND SET INITIATOR IN CHAMBERED POUCH

BACKGROUND

The present product relates generally to cementitious compositions which are particularly useful as wallboard joint compounds, such as are used in finishing gypsum wallboard panels. More specifically, a joint compound is provided in a single dose self contained package having a long shelf life.

Joint compounds are applied to complete the installation of gypsum panels by filling the space between adjacent panels, typically in combination with paper or fiberglass tape. The joint compound is forced into the space between the panels, either before or after the tape is applied. After the space between the panels has been filled, an additional coat or coats of joint compound, either the same as the first or formulated for the purpose, are generally applied to provide a smooth transition between the panels, after which the panels will usually be painted or receive some other surface finish. Joint compounds are also used to repair wall surfaces for the purposes of providing an esthetically pleasing uniform finish ready for final decoration.

Generally, joint compounds include a filler, a binder, and a rheology modifier, typically a thickener. Conventional fillers include calcium carbonate, calcium sulfate dihydrate (gypsum), and calcium sulfate hemihydrate (plaster of Paris). Calcium sulfate hemihydrate sets by hydration to gypsum, while compounds using other fillers harden by simple drying. Thus, joint compounds are usually divided into two types, setting or drying, depending on whether the filler contains a substantial amount of calcium sulfate hemihydrate.

When a powdered setting-type joint compound is mixed with water, the calcium sulfate hemihydrate will react with the water to form gypsum. Typical set times for setting type joint compounds usually are between 5 and 300 minutes and are set by the user in selecting a bag of dry compound having a factory determined setting time. Consequently, water is not typically added to powdered setting-type joint compounds until just prior to use, at which time the setting process begins shortly after the addition of water. Thus, a drawback of setting type joint compounds when used in patching applications is that there is a likelihood of waste, where a portion of the compound often sets before it can be used, or the user mixes too much or too little compound for the particular job.

In addition, there are drawbacks related to the extra step required in mixing a powder with water prior to use. First it requires that potable water be available at the location which is not always the case for new construction. Second, setting type joint compounds can be difficult to mix properly.

To overcome problems of adding water at the time of use, joint compounds have been formulated to prevent the reaction of the hemihydrate with water so that premixed setting-type joint compounds can be manufactured. Setting compounds also have an advantage relative to drying-type joint compounds, since drying-type compounds will shrink during drying, requiring multiple coats and sufficient drying time between coats, making it difficult to achieve a smooth surface suitable for decorating in a timely manner.

Premixed setting-type joint compounds have been suggested in previous patents. For example, U.S. Pat. No. 4,661,161 discloses a set retarding composition in which a proteinaceous ingredient formed from animal tissues and a set preventing agent for calcium ions is used. A set initiator including a compound having a higher log K value than calcium is mixed with the joint compound when setting is desired.

Other ready-mixed, setting type joint compounds are described in U.S. Pat. No. 6,805,741 and in US Patent Publication No. 2008/0229981, which are incorporated by reference.

As noted in U.S. Pat. No. 5,746,822, which is also incorporated by reference, the shelf life of such ready-mixed setting joint compound is not sufficient, since the activity of the set preventer was found to be degraded with time. Thus, the '822 patent discloses an improved setting-type joint compound which includes non-calcium bearing phosphate additives to prevent setting of a premixed calcium sulfate hemihydrate based joint compound which includes water. The shelf life is said to be at least several months.

Thus, there is a need for providing a joint compound with the performance advantages of setting-type compounds without the potential for waste during application due to chemical setting, inconvenience of requiring potable water at the site, and difficulty related to the blending of powders with water via hand mixing.

BRIEF SUMMARY OF THE INVENTION

The present ready mixed setting-type joint compound and set initiator in a self contained chambered, preferably flexible pouch-type container meets or exceeds the drawbacks of the prior art. With the present container, a setting-type joint compound is provided in a dose package suitable for patching applications. The active ingredients are provided in a single package, but are kept separate until use to increase shelf life and to reduce the need for additional potable water at the site. Also, since the container is dose sized, it is less likely to generate wasted compound due to rapid setting. Once it is desired to use the present compound, the user breaks the seal separating two main chambers of compound constituents and manually kneads the contents to thoroughly mix the compound. Preferably, a dye is provided in one of the compartments of the package and changes color to indicate thorough mixing. The dye also acts to highlight surface patched areas which frequently require a light sanding after set. Another feature is that each compartment is provided with constituents having similar viscosity of the adjacent compartment to facilitate manual mixing or kneading. The resulting combination or dose of the constituents has a different viscosity than that of the individual compartments. In addition, by providing supplemental compartments having additional doses of constituents, such as set initiators, the rate of setting is controllable by the user, depending on the number of such compartments which are opened.

More specifically, a dosage size multi-chambered, container is provided having separate sealed compartments and has constituent materials for forming a wallboard joint compound. The container includes a first compartment containing a first mixture including a calcined gypsum, a set preventer and water, and a second compartment isolated from the first compartment with a seal and containing a second mixture including a set initiator and water, wherein upon breaking of the seal, the first and second mixtures are combinable by kneading action to provide a dose of the wallboard joint compound.

In another embodiment, a dosage size multi-chambered container is provided having separate sealed compartments and has constituent materials for forming a wallboard joint compound. The container includes a first compartment containing a first mixture including a calcined gypsum, a set preventer and water, and at least one or more additional compartments isolated from the first compartment with seals and each containing an additive for altering the performance of the resulting mixed dose of compound.

In another embodiment, a dosage size multi-chambered container is provided having separate sealed compartments and has constituent materials for forming a wallboard joint compound. The container includes a first compartment containing a first mixture including a slurry of set prevented calcined gypsum, and having a first viscosity; and a second compartment sealed from the first compartment with a frangible seal and containing a second mixture including a set initiator and water and having a second viscosity, wherein upon mixing the contents of the first and second components, a mixture results having a higher viscosity than the first and second viscosities.

DETAILED DESCRIPTION

Figure 1:
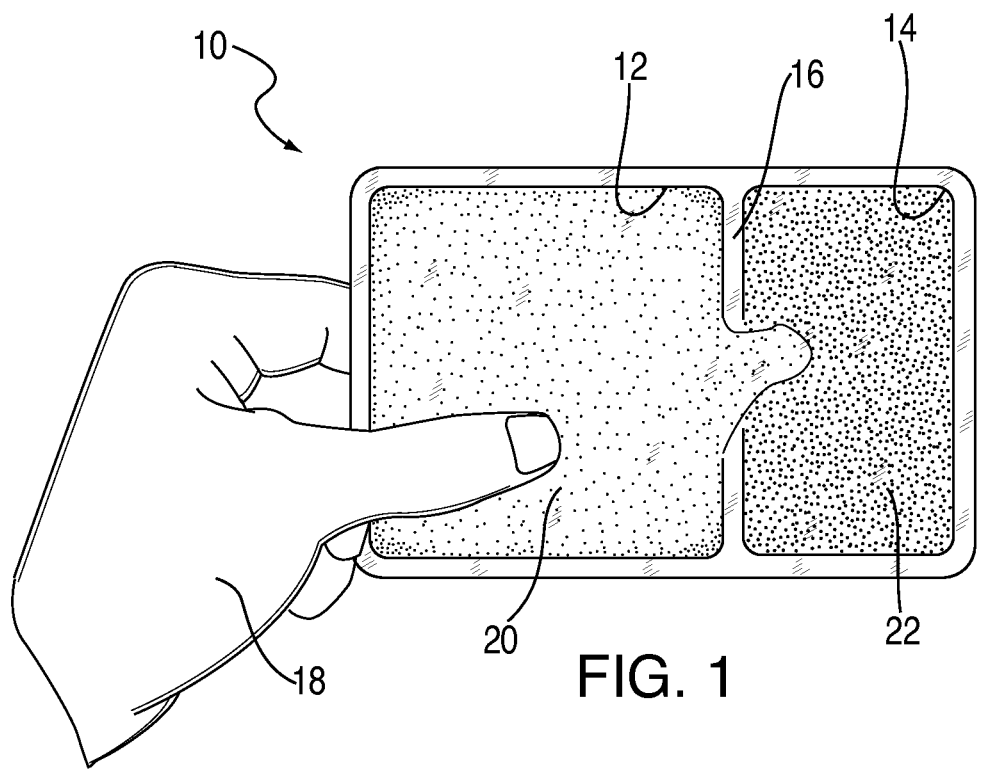
FIG. 1 is an elevation view of the present container showing manipulation by the user and fracturing of the partition to mix respective contents.

Referring to FIG. 1, a container is generally designated 10, and is provided with at least one and preferably several internal compartments 12, 14, each separated by a corresponding divider partition or membrane 16. It is preferred that the container 10 is a self-contained, flexible plastic pouch-type container, however the specific material, and the flexibility may vary to suit the situation. Rigid containers are also contemplated. Also, the divider or membrane 16 is preferably frangible in that it may be broken by manual manipulation without the use of tools. However, other membrane materials also contemplated that require cutting or other actions for opening. The present container 10 is provided in a size that is suitable for dose-type use, such as in patching a wallboard installation. Typical installations are new construction or remodeling. The container 10 is known in the art as being of the type whereby the partition or membrane 16 sealingly separates the contents of the respective compartments 12, 14 until sufficient manipulation or pressure exerted by a user 18 causes the membrane to fracture or rupture, allowing fluid communication between the two or more compartments. As will be described in greater detail below, more compartments are contemplated for successive rupturing of frangible membranes and introduction of fluid between more compartments to adjust the performance of the resulting mixed dose of wallboard joint compound. Subsequent kneading or other manipulation of the container 10 causes mixing of the respective components. Such containers are commercially available from Advanced Pouch Technologies, Fenton, Mo.

In the present container 10, mixable components of a settable type joint compound are retained in the non-reactive state in separate compartments 12, 14 until they are needed for use. The constituents are separated from each other to preserve shelf life. When the joint compound is needed, the user 18 manipulates the container 10 by hand without the use of tools to exert sufficient pressure to break or burst the membrane 16 and allow mixing of the respective components.

As is known in the art, a settable joint compound is one which sets by chemical reaction, rather than by drying. In the present container, the settable joint compound is one which is settable by hydration of calcium sulfate hemihydrate to gypsum. A ready-mixed joint compound of this type will contain water, but will not set since it is prevented from doing so by the presence of a set preventer.

A first mixture 20 is disposed within the first compartment 12 and is a set prevented, slurry form of a setting-type wallboard joint compound. The main ingredients of the first mixture 20 are calcium sulfate hemihydrate, water and a set preventer.

The calcium sulfate hemihydrate ingredient enables the composition to function as a setting type compound. It has been found that the alpha crystalline form of the calcium sulfate hemihydrate is preferred in that it requires less water to achieve a suitable, workable viscosity. In general, at least about twenty percent (20%) by weight of the unwetted first mixture 20 is calcium sulfate hemihydrate, which may range up to about ninety-nine percent (99%) by weight.

A feature of the present first mixture 20 is that the water making the slurry in the first compartment 12 is from a known source to reduce the variation in the time of set. The set time has been known to be influenced by impurities or minerals in various sources of potable water available at construction sites.

As is known in the art, the set preventing agent, here preferably TSPP or other known set preventers, well known in the art as described in U.S. Pat. No. 5,746,822 previously incorporated by reference. Set preventers may be single or multiple components as is known in the art. In particular, (1) zinc hexametaphosphate and (2) potassium tripolyphosphate have been found to provide the long term retardation effect, with (3) tetra sodium pyrophosphate providing the most long lasting set prevention effect. Other effective set preventing agents include (4) sodium tripolyphosphate, (5) monoammonium phosphate and (6) monobasic potassium phosphate. Generally, the set prevention effect is provided by low levels of the phosphate additive, in amounts ranging from about 0.1 to about 10% by weight based on the total composition weight excluding the water.

In preparing the first mixture 20 as a joint compound, conventional joint compound ingredients or additives may be incorporated into the mixture. Calcium carbonate is contemplated as an optional filler. The calcium carbonate may be present in amounts ranging up to about seventy-five percent (75%) by weight of the first mixture 20.

If a lightweight, ready-mixed joint compound is desired, the lightweight property can be provided by incorporating a lightweight filler such as expanded perlite into the formulation in accordance with the disclosure in U.S. Pat. No. 4,454,267, which is incorporated by reference. It is well known in the art that it is preferred that the expanded perlite should have a particle size which will pass through a 50 mesh screen if it is to be incorporated into a joint compound. Perlite is commercially available and is preferably present in amounts of between 5% to 15% by weight of all of the ingredients in the first mixture 20, excluding the water.

A latex emulsion binder is an important ingredient which is well known to those skilled in the joint compound art. Any of the conventional latex binders may be used with polyvinyl acetate and ethylene vinyl acetate emulsions being preferred. In general, if present, the latex binder ranges from about 1% to about 15% by weight of the solids content of the joint compound prior to adding water, preferably about 2 to about 5.5 wt. %

It is generally preferred that the first mixture 20 contains a minor amount of a rheology modifier, such as a thickener, particularly a cellulosic thickener. The conventional cellulosic thickeners, e.g. ethylhydroxy ethylcellulose, hydroxypropyl methylcellulose, methylhydroxypropyl cellulose and hydroxyethyl cellulose, are contemplated in the first mixture 20. The amount of rheology modifier, if present, may range from about 0.1% to about 2% by weight of the total composition ingredients (not including the water added to make it a ready-mix compound).

Ready-mixed joint compounds frequently contain mica, talc or clays to provide various performance properties such as resistance to cracking upon drying. When used in the present joint compounds, the mica or talc or clay may be between about 1% and about 15% by weight of the composition prior to adding water.

It is preferred that the first mixture 20 has a pH in the range of 7-8. In some cases it may be necessary to use an additive, such as citric acid, to lower the pH. In general, the pH control additive may be present in amounts ranging from 0.1-1% by weight of the joint compound composition.

Additional ingredients frequently used in joint compounds are preservatives, wetting agents, antimicrobials, defoamers and plasticizers. These ingredients, if present, are also used in minor amounts generally ranging from about 0.05% to about 1% by weight of the composition prior to adding water.

While a number of setting type joint compounds are known in the art and are contemplated as being suitable for use with the present package 10, the first mixture 20 may contain the following solid ingredients:

TABLE I

| Ingredient | Amount (wt. %) |
|---|---|
| Filler: | |
| Calcium Sulfate Hemihydrate | 20-90 |
| Calcium Carbonate | 0-75 |
| Set Preventer: | |
| Phosphate compound | 0.1-10 |
| Preservatives | 0.05-1 |
| Binder: (if desired) | |
| Latex Emulsion | 1-15 |
| Rheology Modifier: (if desired) | |
| Cellulosic Material | 0.1-2 |
| Lightweight Ingredient: (if desired) | |
| Treated, Expanded Perlite | 3-25 |

In the other compartment 14, a second mixture 22 including a set initiator is provided. The set initiator is preferably taken from the group consisting of aluminum sulfate, zinc sulfate and iron sulfate, and is provided in an approximate of wt % of 82.8. The present ready-mixed cementitious composition resulting from the combination of the first and second mixtures 20, 22 is capable of functioning as a setting type joint compound upon activation by the set initiator which initiates the setting action. The set initiator overcomes the retarding effect of the phosphate. A preferred set initiator is aluminum sulfate, or zinc sulfate in a solution ranging form 10-30% zinc sulfate. Another preferred set initiator blend is a solution made from 95% by weight of zinc sulfate and 5% red iron oxide. An especially preferred set initiator is USG Gypsum Accelerator supplied in a concentration range of 100 g to 300 g per liter of water.

While other formulations are contemplated, in the preferred embodiment, both the first mixture (joint compound) 20 and the second mixture 22 (set initiator) are provided in liquid or fluid form. It is especially preferred that the second mixture 22 is formulated to include a rheology modifier as described above and water. The preferred rheology modifier is a cellulosic thickener and is provided in a range of wt % of 0.1-2%.

Upon breaking of the seal 16, the first and second mixtures 20, 22 are combinable by kneading action to provide a dose of the desired settable wallboard joint compound. In a preferred embodiment, a pigment is provided in one of the first and second compartments 12, 14 that is indicative of the degree of mixing of the first and second mixtures 20, 22. The pigment could be a standard dye, a pH-based indicator, a chelation based indicator or other known color indicator. As mixing progresses, the color of the combined mixture changes.

In addition to indicating the degree of mixing of the first and second mixtures, the pigment is also visible once the resulting dose compound is applied on the wall. Thus, the user has a visual indication of where additional wall repair may be needed. Acceptable pigments include acid-base indicators, and calcium ion concentration indicators, both of which are commercially available.

Another feature of the present package 10 is that the first mixture 20 is formulated to have a first viscosity, and the second mixture 22 is formulated to have a second viscosity. Upon breaking the seal 16 and mixing the first and second mixtures 20, 22 together, a mixed dose of joint compound results having a higher viscosity than the components of the separate compartments. The lower viscosity of the pre-mixed components facilitates manual mixing through kneading.

More specifically, the first mixture has a preferred viscosity in a broadest range of 150-1,000 Brabender units—(11850-79000 cps), a more preferred range of 300-500 Brabender units (23700-39500 cps), and a most preferred viscosity in the range of 400-450 Brabender units (31600-35500 cps), with the second mixture 22 having a preferred viscosity approximating that of water at room temperature. The viscosity is measured on a VC-3 Brabender viscometer. Viscosity is measured at room temperature (about 25° C.) using a 250 centimeter-gram torsion head operated at a 72-78 r.p.m. spindle speed.

The preferred ratio is 6 ml of the second mixture 22 (set initiator) per 100 ml of the first mixture 20. Upon mixing the two mixtures 20, 22, the resulting joint compound sets in about 20 minutes.

While the use of citric acid is described above, it is also contemplated that the first mixture 20 optionally includes sodium hydroxide or the like to raise the pH. Another option is to provide the second mixture 22 with an alkali swellable rheology modifier and to provide the first mixture 20 with an additive for raising the pH sufficiently to cause the alkali swellable modifier to swell and thicken. An example of an alkali swellable modifier is cellulosic ether, or an associative thickener.

Example 1

A preferred ready mix joint compound was prepared with two mixtures 20 and 22 separated by the frangible seal 16 in the package 10. The first mixture 20 included the following:

| | g | wt. % |
|---|---|---|
| Calcined gypsum (Hydrocal A Base) | 998.00 | 41.05 |
| Talc (Talcron MP 45-26) | 250.00 | 10.28 |
| Expanded Perlite (Silbrico 35-23) | 105.00 | 4.32 |
| Attapulgite clay (BASF Gel B) | 75.00 | 3.09 |
| Cellulosic thickener (Methocel J12MS) | 7.50 | 0.31 |

-continued

|  | g | wt. % |
|---|---|---|
| Polyvinyl alcohol (Celvol 205-S) | 3.00 | 0.12 |
| Set Preventer (TSPP) | 3.75 | 0.15 |
| Citric Acid-chelating agent/pH adjust | 1.50 | 0.06 |
| Water | 900.00 | 37.02 |
| Polyvinyl acetate Emulsion (Halltech HP 41-830) | 77.72 | 3.20 |
| Bactericide (Nuosept 91) | 4.75 | 0.20 |
| Fungicide (Fungitrol 158) | 4.75 | 0.20 |
|  | 2430.97 | 100.00 |

The second mixture 22 included the following:

| Aluminum Sulfate | 150 g per liter of water |
|---|---|

In the above and following examples, the sources of the ingredients are as follows:

| Calcined gypsum (Hydrocal A Base) | United States Gypsum Company 500 West Adams Chicago, IL 60661 |
|---|---|
| Talc (Talcron MP 45-26) | Barretts Inc., a subsidiary of Specialty Minerals, Inc. 8625 HWY 91 S. Dillon, MT 59725 |
| Expanded Perlite (Silbrico) | Silbrico Corporation 6300 River Road Hodgkins, IL 60525 |
| Attapulgite clay (BASF Gel B) | BASF Corp. 100 Campus Dr. Florham Park, NJ 07932 |
| Cellulosic thickener (Methocel) | The Dow Chemical Co. Midland, MI 48674 |
| Polvinyl alcohol (Celvol 205-S) | Celanese Ltd. 1601 W. LBJ Freeway P.O. Box 819005 Dallas, TX 75381 |
| Set preventer (TSPP) | VanWaters and Rigers 2256 Junction Avenue San Jose, CA 95131 |
| Citric acid | Pfizer Chemical Co. 235 East 42$^{nd}$ Street New York, NY 10017 |
| Water | municipal water, Gypsum, OH |
| Polyvinyl acetate emulsion (Halltech HP 41-830) | Halltech, Inc. 465 Coronation Drive, Scarborough, ON M1E 2K2 Canada |
| Bactericide (Nuosept 91) | ISP 1361 Alps Road Wayne, NJ 07470 |
| Fungicide (Fungitrol 158) | ISP 1361 Alps Road Wayne, NJ 07470 |
| Aluminum Sulfate | United States Gypsum Company 500 West Adams Chicago, IL 60661 |
| Biocide (Mergal 174) | Troy Corporation P.O. Box 955 8 Vreeland Road Florham Park, NJ 07932 |

Example 2

As an alternative, a preferred ready mix joint compound was prepared as the first mixture 20, which lacks the rheology modifier (here thickener) and included the following:

|  | g | wt. % |
|---|---|---|
| Calcined gypsum (Hydrocal A Base) | 998.00 | 39.55 |
| Talc (Talcron MP 45-26) | 250.00 | 9.91 |

|  | g | wt. % |
|---|---|---|
| Expanded Perlite (Silbrico 35-23) | 105.00 | 4.16 |
| Attapulgite clay (BASF Gel B) | 75.00 | 2.97 |
| Polyvinyl alcohol (Celvol 205-S) | 3.00 | 0.12 |
| Chelating agent (TSPP) | 3.75 | 0.15 |
| Citric Acid-chelating agent/pH adjust | 1.50 | 0.06 |
| Water | 1000 | 39.63 |
| Polyvinyl acetate emulsion(Halltech HP 41-830) | 77.72 | 3.08 |
| Bactericide (Nuosept 91) | 4.75 | 0.20 |
| Fungicide (Fungitrol 158) | 4.75 | 0.20 |
|  | 2523.47 | 100.00 |

The second mixture 22 included the following and included the rheology modifier (here thickener):

|  | g | wt. % |
|---|---|---|
| Aluminum Sulfate (non retarded) | 150 | 82.9 |
| Cellulosic thickener (Methocel 426) | 30 | 16.6 |
| Mergal 174 biocide | 1 | 0.5 |
|  | 181 | 100.00 |

In Example 2, the preferred viscosity for the first mixture 20 is less than 350 Brabender units (27650 cps), and most preferably less than 150 Brabender units (11850 cps). The preferred viscosity of the second mixture 22 is also less than 350 Brabender units (27650 cps), and most preferably less than 150 Brabender units (11850 cps). Upon mixing, the combined viscosity is in the range of 400-500 Brabender units (31600-39500 cps) within 3 minutes, and greater than 300 Brabender units (23700 cps) units within 5 minutes. Once mixed, the resulting combination of the first and second mixtures 20, 22 begins to set and the viscosity rises until the composition is solid. However in this option, the initial thickening is not due to the setting, but to the action of the thickener.

Figure 2:
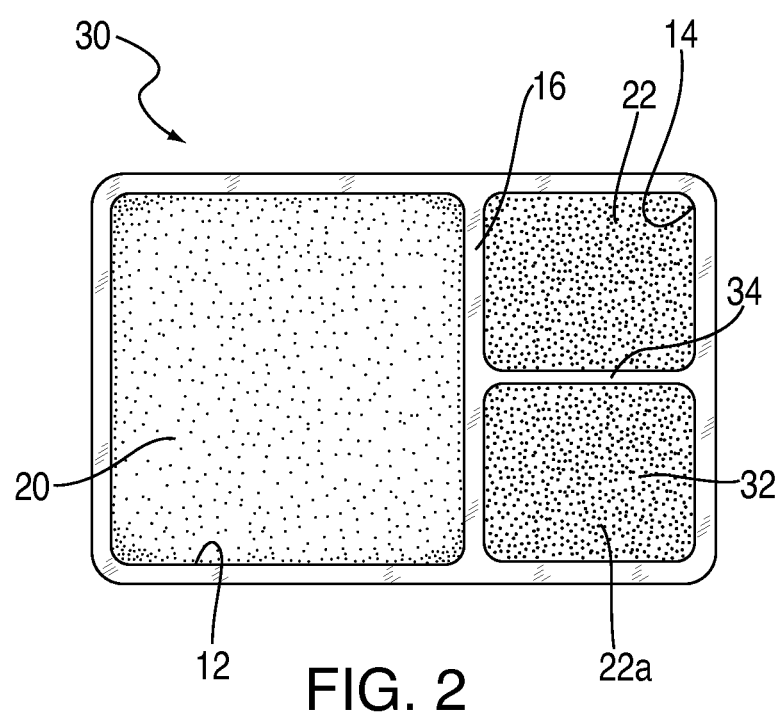
FIG. 2 is an elevation view of an alternate container to that depicted in FIG. 1.

Referring now to FIG. 2, an alternate package to the package 10 is generally designated 30. Components shared with the package 10 are designated with identical reference numbers. A main difference between the packages 10 and 30 is that the package 30 includes a third compartment 32 having a second dose 22a of the second mixture 22 (set initiator, water and optionally a rheology modifier). A second seal 34 separates the compartments 14 and 32. In this manner, the user 18 can adjust the rate of setting of the resulting joint compound by incorporating a single or double dose of set initiator. It will be understood that the amount of set initiator may vary to suit the needs of the particular application. Additional compartments 32 may be added as needed to incorporate various additives which may be optionally incorporated by the user upon similar manipulation of the seal 16 to cause it to break and permit combination of the components. With either embodiment 10, 30, upon use, the user 18 manipulates the container to break the seals 16, 34 and thoroughly mixes the two mixtures 20, 22. When mixing is complete, as indicated by a color change, the user cuts a corner of the container 10, 30 to dispense the resulting mixed dose of joint compound as needed.

While a particular embodiment of the ready mix setting type joint compound and set initiator in chambered pouch has been described herein, it will be appreciated by those skilled in the art that changes and modifications may be made thereto without departing from the invention in its broader aspects and as set forth in the following claims.

The invention claimed is:

1. A dosage size multi-chambered container having separate sealed compartments and provided with constituent materials for forming a wallboard joint compound, comprising:
   a flexible body including a top surface and a bottom surface spaced from said top surface, and a first compartment and a second compartment,
   said first compartment containing a first mixture including calcined gypsum, a set preventer and water from a single, known water source, wherein said water has known properties to reduce the variation of time of set, said first mixture having a first viscosity, said water not being from a water source at a site where the wallboard joint compound is formed;
   said second compartment containing a second mixture including a set initiator and said water from the single, known water source, said second mixture having a second viscosity, wherein only one of said first and second mixtures includes a rheology modifier; and said flexible body consisting of:
   a frangible seal having opposing, internal side surfaces extending between the top surface and the bottom surface of the body, the seal being formed between said first compartment and said second compartment, and configured to break upon application of pressure against one of the side surfaces by a user's hand without rupturing said flexible body, and upon breaking of said seal, said first and second mixtures are readily combined by kneading action to provide a dose of the wallboard joint compound contained in said flexible body that is immediately usable on a surface.

2. The container of claim 1 wherein said first mixture and said second mixture are both liquids.

3. The container of claim 1 further including a pigment in one of said first and second compartments that is indicative of the degree of mixing of said first and second mixtures.

4. The container of claim 3 wherein said pigment is a pH based indicator.

5. The container of claim 3 wherein the pigment is a calcium chelating indicator.

6. The container of claim 1 wherein said seal is breakable and said first and second mixtures are mixable by hand without the use of tools.

7. The container of claim 1 wherein said first mixture includes a latex binder.

8. The container of claim 1 wherein said set initiator is taken from the group consisting of aluminum sulfate, zinc sulfate and iron sulfate.

9. The container of claim 1 further including a third compartment including a second dose of said set initiator and water from said single water source for providing the user with the ability to adjust the rate of setting of the combination of the first and second mixtures.

10. A dosage size multi-chambered container having separate sealed compartments and including constituent materials for forming a wallboard joint compound, comprising:
    a flexible body consisting of:
      a top surface and a bottom surface spaced from said top surface;
      a first compartment containing a first mixture including a calcined gypsum, a set preventer and water from a single, known water source, wherein said water has known properties to reduce the variation in time of set, said first mixture having a first viscosity, said water not being from a water source at a site where the wallboard joint compound is formed; and
      two additional compartments each isolated from said first compartment with frangible seals and each containing an additive for altering the performance of the resulting mixed dose of compound, wherein at least one of said additives includes a set initiator and a thickener and has a second viscosity,
      each of said frangible seals having opposing, internal side surfaces extending between the top surface to the bottom surface of the body, said frangible seals each being configured to break upon application of pressure against one of the side surfaces of at least one of said seals by a user's hand without rupturing said flexible body, and upon mixing of the first mixture and at least said additive results in a mixture contained within said flexible body that is immediately usable on a surface.

11. A dosage size multi-chambered, flexible container having separate sealed compartments and provided with constituent materials for forming a wallboard joint compound, consisting of:
    a flexible body including a top surface, a bottom surface spaced from said top surface, and a first compartment and a second compartment,
    said first compartment containing a first mixture including a slurry of set prevented calcined gypsum, and having a first viscosity; and
    said second compartment sealed from said first compartment with a frangible seal and containing a second mixture including a set initiator, a thickener and water from a single, known water source, wherein said water has known properties to reduce the variation in time of set, and said second mixture having a second viscosity, said water not being from a water source at a site where the wallboard joint compound is formed, said frangible seal having opposing, internal side surfaces extending between the top surface to the bottom surface of the body, and being configured to break upon application of pressure against one of the side surfaces of said seal by a user's hand without rupturing said flexible body, and upon mixing the contents of said first and second compartments, a mixture results that is contained within said flexible body and immediately usable on a surface.

* * * * *